United States Patent
Hamada et al.

(10) Patent No.: US 6,206,351 B1
(45) Date of Patent: Mar. 27, 2001

(54) PNEUMATICALLY OPERATED ACTIVE VIBRATION DAMPING DEVICE HAVING PRESSURE REGULATING DEVICE

(75) Inventors: Masaaki Hamada, Kounan; Akio Saiki, Inuyama, both of (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/578,897

(22) Filed: May 26, 2000

(30) Foreign Application Priority Data

Jun. 16, 1999 (JP) .................................................. 11-170006

(51) Int. Cl.[7] ...................................................... F16M 5/00
(52) U.S. Cl. .................................. 267/140.14; 267/140.13
(58) Field of Search ........................ 267/140.11, 140.13, 267/140.14, 140.15, 219; 248/550, 562, 566, 636, 638

(56) References Cited

U.S. PATENT DOCUMENTS

| | | | |
|---|---|---|---|
| 5,167,403 | * 12/1992 | Muramatsu et al. | 267/140.13 |
| 5,205,546 | * 4/1993 | Schisler et al. | 267/140.13 |
| 5,314,173 | * 5/1994 | Ide et al. | 267/140.14 |
| 5,386,977 | * 2/1995 | Quast | 267/140.13 |
| 5,437,438 | * 8/1995 | Takano et al. | 267/140.14 |
| 5,839,720 | * 11/1998 | Kojima | 267/140.14 |
| 5,865,428 | * 2/1999 | Kojima | 267/140.14 |
| 6,082,718 | * 7/2000 | Yamada et al. | 267/140.14 |

FOREIGN PATENT DOCUMENTS

| | | |
|---|---|---|
| 2 161 241 | 1/1986 | (GB) . |
| 60-8540 | 1/1985 | (JP) . |
| 61-2939 | 1/1986 | (JP) . |
| 61-59035 | 3/1986 | (JP) . |
| 61-191543 | 11/1986 | (JP) . |
| 10-238587 | 9/1998 | (JP) . |

* cited by examiner

Primary Examiner—Christopher P. Schwartz
(74) Attorney, Agent, or Firm—Rossi & Associates

(57) ABSTRACT

A pneumatically operated active vibration damping device is disclosed, which comprises: a first and a second mounting member elastically connected with each other by an elastic body interposed therebetween; a working air chamber adapted to apply an oscillating force between the first and second mounting member, based on a periodic change of an air pressure in the working air chamber; an air piping system connected to the working air chamber and cooperate with the working air chamber to define a negative pressure applied region; a switch valve connected to the air piping system and operable for connecting the air chamber alternately to a vacuum source and an atmosphere for thereby causing the periodic change of the air pressure in the working air chamber; and at least one pressure-regulating valve connected to the negative pressure applied region and optionally operable for introducing the atmosphere into the negative pressure applied region, when the level of the negative pressure in the negative pressure applied region is higher than a predetermined negative pressure level, for thereby adjusting a level of the negative pressure applied to the working air chamber.

19 Claims, 4 Drawing Sheets

PNEUMATICALLY OPERATED ACTIVE VIBRATION DAMPING DEVICE HAVING PRESSURE REGULATING DEVICE

BACKGROUND OF THE INVENTION

1. Field of the Invention

The present invention relates generally to an active vibration damping device which is interposed between two members of a vibration system for connecting these two members or mounting one of these members on the other member in a vibration damping manner, so as to actively damp or reduce vibration transmitted from one of the two members to the other. More particularly, the present invention is concerned with a pneumatically operated active vibration damping device which includes an air chamber formed between the two members, for applying an oscillating force between the two members based on a periodic change of the air pressure in the air chamber.

2. Description of the Related Art

An active vibration damping device is known as one type of a vibration damping device, such as a vibration damping coupling (bushing) or mount, which is interposed between two members of a vibration system so as to flexibly connect these two members or mount one of these members on the other member in a vibration damping manner. Such an active vibration damping device, as disclosed in JP-A-60-8540 (publication of Japanese unexamined patent application), JP-A-61-2939 (publication of Japanese unexamined patent application), and JP-U-61-191543 (publication of Japanese unexamined utility model application), for example, includes: a first and a second mounting member which are spaced apart from each other; an elastic body elastically connecting the first and second mounting members; and an oscillating force generating device which is adapted to generate and apply an oscillating force between the two mounting members, thereby adjusting vibration damping characteristics of the vibration damping device. The active vibration damping device is operable for generating the oscillating force corresponding to the vibration to be damped, and applying the oscillating force to the vibration member whose vibration to be damped, so that the active vibration damping device is capable of eliminating or reducing the vibration to be damped by canceling the input vibration by the oscillating force, or is capable of actively adjusting spring characteristics thereof according to the input vibration so as to exhibit effectively low dynamic spring constant thereof. The thus constructed active vibration damping device is considered to apply as an engine mount or a body mount for an automotive vehicle.

There is also proposed an active vibration damping device of another type wherein an air chamber is formed between a first and a second mounting member and is alternately connected to a vacuum source and an atmosphere by a switching operation of a switch valve, causing the oscillating force based on a periodic change of the air pressure in the air chamber, at a frequency corresponding to the frequency at which the switch valve is alternately placed in two operating positions, namely a "vacuum position" for communication of the air chamber with a vacuum source, and an "atmospheric position" for communication of the air chamber with the atmosphere. This pneumatically operated type of active vibration damping device does not require a heavy and complicated member such as an electromagnetic actuator to be incorporated therein, resulting in reduction in the number of the required components, the size, weight and the required amount of electric power consumption of the device.

In the pneumatically operated type of active vibration damping device constructed as described above, it is important and desirable to control the switch valve and the negative pressure in the air chamber so that not only the frequency and phase but also the amplitude of the oscillating force correspond to those of the vibration to be damped, thereby improving the active damping effect with respect to the vibration of the vibratile member of the vibration system.

To meet the need indicated above, there is proposed to (a) detect the frequency, phase and amplitude of the vibration to be damped, by using a suitable sensor such as an accelerometer or acceleration sensor, or estimate those frequency, phase and amplitude according to predetermined data maps, (b) control the frequency and phase of the switching operation of the switching valve, so that the frequency and phase of the oscillating force correspond to those of the vibration to be damped, and (c) control the negative pressure in the air chamber so that the amplitude of the oscillating force corresponds to that of the vibration to be damped.

Where the pneumatically operated vibration damping device is used for an automotive vehicle, and the air intake system of the engine of the vehicle is used as the vacuum source, it is difficult to regulate the negative pressure in the air intake system as a vacuum source, and it is therefore difficult to obtain the oscillation force whose amplitude corresponds to that of the vibration to be damped. The active vibration damping device does not provide a sufficient active vibration damping effect, if the amplitude of the oscillating force does not accurately correspond to that of the vibration of the object.

To meet recent requirements of automotive vehicles such as an improved specific fuel consumption and purification of exhaust gases, there has been proposed an improved internal combustion engine whose combustion mode is selectable from a stoichiometric combustion mode where a fuel-air mixture is introduced into a combustion chamber for performing a combustion, and a stratified charge combustion mode where a fuel is directly injected into the combustion chamber at a later stage of an air compression stroke. In the stoichiometric-combustion operation of this type of engine, the engine is likely to generate a vibration whose amplitude is relatively large, while the negative pressure in the air intake system of the engine, as a vacuum source, is decreased (close to the atmospheric pressure). In the stratified charge combustion operation of the engine, on the other hand, the engine is likely to generate a vibration whose amplitude is relatively small, while the negative pressure in the air intake system is increased. This characteristics of the proposed internal combustion engine causes a difficulty in tuning of the vibration damping device which is installed in the vehicle having the above-indicated improved internal combustion engine.

For instance, the vibration damping device which is tuned so as to exhibit a desired damping effect with respect to the vibration generated in the stoichiometric combustion operation of the engine, suffers from incapability of exhibiting a sufficient damping effect, i.e., generating a sufficient oscillating force with respect to the vibration generated in the stratified charge combustion operation of the engine. On the other hand, the vibration damping device which is tuned so as to exhibit a desired damping effect with respect to the vibration generated in the stratified charge combustion operation of the engine, is prone to generate the excessively large oscillating force with respect to the vibration generated in the stoichiometric combustion operation of the engine, possibly deteriorating the vibration in the vibratile member of the vibration system.

SUMMARY OF THE INVENTION

It is therefore an object of this invention to provide a pneumatically operated active vibration damping device which is novel and simple in structure and which is capable of exhibiting an excellent and stable vibration damping effect, irrespective of a pressure change in a vacuum source to which a working air chamber of the device is connected.

The above object may be accomplished according to the principle of the present invention which provides a pneumatically operated active vibration damping device interposed between two members of a vibration system for connecting the two members in a vibration damping manner, comprising: (a) a first and a second mounting member which are spaced apart from each other and are attachable to the two members of the vibration system, respectively; (b) an elastic body elastically connecting the first and second mounting members; (c) a working air chamber adapted to apply an oscillating force between the first and second mounting members, based on a periodic change of an air pressure in the working air chamber; (d) an air piping system connected to the working air chamber and cooperate with the working air chamber to define a negative pressure applied region; (e) a switch valve connected to the air piping system and operable for connecting the air chamber alternately to a vacuum source and an atmosphere for thereby causing the periodic change of the air pressure in the working air chamber; and (f) at least one pressure-regulating valve connected to the negative pressure applied region and operable for introducing the atmosphere into the negative pressure applied region, when a level of the negative pressure in the negative pressure applied region is higher than a predetermined level of the negative pressure, for thereby adjusting the level of the negative pressure applied to the working air chamber.

In the pneumatically operated active vibration damping device of the present invention constructed according to the above mode of the present invention, the pressure-regulating valve is operated when the level of the negative pressure applied from the vacuum source to the working air chamber is higher than the predetermined negative pressure level, so that the atmosphere is introduced into the negative pressure applied region. In this condition, the excess negative pressure is relieved by the introduction of the atmosphere through the pressure-regulating valve, so that an average value of the air pressure in the negative pressure applied region is made closer to the atmospheric pressure, that is the level of the negative pressure in the negative pressure applied region is made lower. In this arrangement, a maximum level of the negative pressure (an maximum absolute value of the negative pressure) in the negative pressure applied region is effectively adjusted to be substantially equal to or lower than the predetermined negative pressure level (a predetermined absolute value of the negative pressure), thereby preventing an application of an excessively large negative pressure force to the working air chamber. In particular, the level of the negative pressure applied to the working air chamber can be maintain at around the predetermined negative pressure level, by suitably adjusting the predetermined negative pressure level, taken into account a fluctuation range of the negative pressure in the vacuum source.

The vibration damping device of this mode (hereinafter referred to as a "first mode") of the invention is capable of controlling or reducing an amount of variation of an amplitude of the periodic change of the air pressure in the working air chamber, that is, an amount of variation of the pressure difference between the negative pressure and the atmosphere which are applied to the working air chamber, irrespective of a pressure change in the vacuum source. Thus, the vibration damping device of the present mode of the invention is capable of preventing a significant variation of the oscillating force, and accordingly exhibiting a desired damping effect with high stability. In particular, the provision of the pressure-regulating valve makes it possible to eliminate a need for a specific control with respect to the pressure in the vacuum source, and to stabilize the negative pressure force applied to the working air chamber, without such a control.

The predetermined negative pressure level by which the operation of the pressure-regulating valve is controlled, may be desirably determined without any limitation, but may preferably be determined taken into account desired damping characteristics and oscillating force of the vibration damping device, a pressure-variation characteristics of the vacuum source, and the like. For instance, the predetermined negative pressure level used for the operation of the pressure-regulating valve may be determined to a lowest level or a minimum absolute value (a value that is most closest to the atmospheric pressure) of the negative pressure within a variation of the negative pressure in the vacuum source. In this case, the level of the negative pressure applied to the working air chamber is made substantially constant at around the predetermined negative pressure level, making is possible to stabilize the amount of variation of the air pressure applied to the working air chamber and accordingly to stabilize the oscillating force generated by the vibration damping device with high preciseness. The predetermined negative pressure level is not necessarily be a numerical value, but may be a predetermined negative pressure level. That is, the pressure-regulating valve may be adjusted to be opened to introduce the atmosphere into the negative pressure applied region when the level of the negative pressure in the negative pressure applied region exceeds the predetermined negative pressure level.

The construction of the switch valve provided in the active vibration damping device according to the present mode of the invention is not particularly limited. Preferably, it may be a switch valve which permits a switching operation thereof for alternately connecting and disconnecting the working air chamber to and from the vacuum source and the atmosphere at a frequency corresponding to the frequency of the vibration to be damped. It is preferable to use a spool valve, a poppet valve, a rotary valve and any other known valve, particularly, a solenoid-operated valve in view of its high controllability.

The switch valve may be connected to any portion of the air piping system between the working air chamber and the vacuum source. For instance, the air piping system is independent of a mount unit including the first and second mounting members and the elastic body elastically connecting the first and second mounting members, and the switch valve is connected to a portion of the air piping system, which portion is remote from the mount unit.

Further, the construction of the pressure-regulating valve provided in the active vibration damping device of the present mode of the invention is not particularly limited. It may be preferable to use a direct-driven type pressure-regulating valve whose valve member is biased by a helical compression spring toward a predetermined direction so as to fluid-tightly close the valve, and is opened and closed based on a balance between an air pressure force applied to the valve member (the pressure difference between the negative and atmospheric pressures applied thereto) and a biasing force of the helical compression spring, and a modification of this direct driven type pressure-regulating valve which further includes an adjustable screw for adjusting an amount of compression of the helical compression spring so as to adjust the predetermined negative pressure level of the helical compression spring, for instance. Alternatively, it is preferable to use a pilot type pressure-regulating valve, which accommodate a pilot device and regulate the predetermined negative pressure level with high preciseness by utilizing a secondary pressure of the pilot device. In this respect, the number of the pressure-regulating valve is not particularly limited. The pressure-regulating valve may be disposed either one portion, or alternatively on a plurality of portions of the negative pressure applied region.

In a second preferred mode of the present invention according to the first mode of the invention, the pressure-regulating valve is connected to a portion of the negative pressure applied region between the switch valve and the working air chamber. This arrangement is effective to prevent or reduce an adverse influence on the vacuum source of the atmospheric pressure introduced through the pressure-regulating valve, thereby avoiding undesired reduction in the level or the absolute value of the negative pressure in the vacuum source. Accordingly, it may be avoided undesired influence of this reduction in the negative pressure level of the vacuum source on the other equipment or devices which are connected to the vacuum source.

In a third preferred mode of the present invention according to the first or second mode of the invention, the air piping system further includes an atmosphere introducing passage connected to the pressure-regulating valve for introducing the atmosphere to the negative pressure applied region through the pressure-regulating valve, and an atmospheric conduit connected to the switch valve for connecting the negative pressure-regulating region with the atmosphere, the atmosphere introducing passage is connected to the atmospheric conduit, for thereby introducing the atmosphere to the pressure-regulating valve through said atmospheric conduit.

As described above, when the level of the negative pressure in the negative pressure applied region is higher than the predetermined negative pressure level, the pressure-regulating valve is operated, that is, is opened to introduce the atmosphere into the negative pressure applied region through the atmosphere introducing passage. In this case, the atmosphere introducing passage is likely to make a noise due to the air flowing therethrough at a relatively high velocity. In this preferred mode, however, the atmosphere introducing passage is connected to the atmospheric conduit, so that the atmosphere is introduced into the negative pressure applied region surely through the atmospheric conduit. The atmospheric conduit, in this case, functions as a muffler or silencer, ensuring reduction in the noise with such a simple structure.

In a fourth preferred mode of the invention according to any one of the first through third modes of the invention, the active vibration damping device further comprising: a silencer which is disposed in the atmosphere introducing passage. In this arrangement, the silencer is operated to eliminate or reduce noise caused by the atmosphere flowing through the pressure-regulating valve upon operation of the pressure-regulating valve, resulting in an effective elimination of the problem of the noise.

In a fifth preferred mode of the invention according to any one of the first through fourth modes of the invention, the pressure-regulating valve is fixedly incorporated in the switch valve. Such an integral structure of the pressure regulating and switch valves permits an installation thereof on the air piping system with high simplicity in construction, high efficiency in assembling, and high space utilization.

In a sixth preferred mode of the invention according to any one of the first through fifth modes of the invention the first and second mounting members and the elastic body elastically connecting the first and second mounting members constitute a mount unit, and the air piping system is independent of the mount unit, while the pressure-regulating valve is fixedly incorporated in the mount unit.

Such an integral structure of the mount unit and the pressure-regulating valve permits an installation thereof on the air piping system with high simplicity in construction, high efficiency in assembling, and high space utilization. The present mode of the invention can be applicable to any conventional vibration damping device equipped with the switch valve, by only fixedly incorporating the pressure-regulating valve in the damping device, without requiring an enlargement or complication in structure of the switch valve as in the case where the pressure-regulating valve is incorporated in the switch valve.

In a seventh preferred mode of the invention according to any one of the first through sixth modes of the invention, the vacuum source comprises a negative pressure generated in an air intake system of an internal combustion engine which selectively adopts a stratified charge combustion mode and a stoichiometric combustion mode for fuel-combustion operation thereof.

This arrangement permits an effective regulation of the negative pressure in the negative pressure applied region during the stoichiometric combustion operation of the internal combustion engine in which the level (the absolute value) of the negative pressure in the vacuum source is relatively high. Thus, the active vibration damping device according to the presently preferred mode of the invention makes it possible to eliminate or prevent the conventionally experienced problem of the deterioration of the vibration to be damped due to the application of the excessively large oscillating force in the working air chamber caused by the excessively-high negative pressure generated in the stoichiometric combustion operation of the engine.

For instance, the active vibration damping device of the present mode of the invention permits a desired damping effect, even in the case where the vibration damping device is tuned so as to exhibit its vibration damping effect with respect to the vibration generated in the stratified charge combustion operation of the engine in which the absolute value of the negative pressure in the vacuum source is made small, since the excessively-high negative pressure in the stoichiometric combustion operation of the engine is desirably regulated by means of the pressure-regulating valve. Thus, the active vibration damping device of the presently preferred mode of the invention is capable of exhibiting its damping effect with respect to both of the vibration generated in the stoichiometric combustion operation and the vibration generated in the stratified charge combustion operation. It is noted that, the predetermined level of the negative pressure used for the operation of the pressure-regulating valve may be set to a negative pressure level a least lower than that in the stoichiometric combustion operation of the engine, more preferably be set to a negative pressure level substantially equal to or lower than that in the stratified charge combustion operation of the engine.

In a eighth preferred mode of the present invention according to any one of the first through seventh modes of the invention, the present active vibration damping device further comprises a pressure regulation restricting device which is operable to restrict operation of the pressure-regulating valve as needed.

In this preferred mode of the invention, the pressure regulation restriction device is operable to inhibit the operation of the pressure-regulating valve, so that the negative pressure in the vacuum source can be directly applied to the working air chamber without being regulated or adjusted by the pressure-regulating valve. Therefore, the active vibration damping device can generate a relatively large oscillating force, by operating the pressure regulation restricting device, as needed, so as to apply to the working air chamber the high negative pressure in the vacuum source.

For instance, the vibration damping device of the presently preferred mode of the invention is preferably usable with the above-indicated internal combustion engine having two combustion modes, namely the stoichiometric combustion mode and the stratified charge combustion. In this case, the pressure regulation restricting device is operated during stratified charge combustion operation in order to inhibit the operation of the pressure-regulating valve, while the predetermined negative pressure level used for the operation of the pressure-regulating valve is set to an negative pressure level lower than the level of the negative pressure applied to the working air chamber during the stratified charge combustion operation of the engine. This makes it possible to apply a sufficiently high negative pressure to the working air chamber during the stratified charge combustion operation of the engine in which the relatively low negative pressure in the vacuum source is available, rather than during the stoichiometric combustion operation of the engine in which the relatively high negative pressure in the vacuum source is available. Therefore, the present vibration damping device is capable of exhibiting a desired damping effect with respect to the large-amplitude vibration in the stratified charge combustion operation of the engine by directly applying to the working air chamber the relatively-low available negative pressure in the vacuum source, without regulation by means of the pressure-regulating valve, and the small-amplitude vibration in the stratified charge combustion of the engine by reducing the relatively-high available negative pressure in the vacuum source to the predetermined negative pressure level by means of the pressure-regulating valve, and applying to the working air chamber the reduced negative pressure.

In a ninth preferred mode of the present invention according to any one of the first through eighth modes of the invention, the pneumatically operated active vibration damping device further comprises a fluid chamber partially defined by the elastic body, which is disposed between the first and second mounting members, and which is filled with a non-compressible fluid, and a movable member partially defining the fluid chamber on one of opposite sides thereof and the working air chamber on the other side thereof which is remote from the fluid chamber, the movable member being oscillated by the periodic change of the air pressure in the working air chamber so as to induce a pressure change of the fluid in the fluid chamber, for generating the oscillating force between the first and second mounting members.

In this arrangement, a periodic change of the air pressure in the working air chamber is transmitted between the first and second mounting member via a pressure change of the fluid filling the fluid chamber. This permits effective generation of the oscillating force acting between the first and second mounting members, based on the flow of the fluid within the fluid chamber, e.g., a resonance of the fluid, resulting in an improved vibration damping effect.

In a tenth preferred mode of the present invention according to the ninth mode of the invention, the pneumatically operated active vibration damping device further includes a partition member supported by the second mounting member and adapted to fluid tightly divide the fluid chamber into a pressure-receiving chamber partially defined by the elastic body on one of opposite sides thereof, to which a vibrational load is applied and a working fluid chamber partially defined by the movable member on the other side thereof, to which the oscillating force is applied, and an orifice passage formed through the partition member and allowing a fluid communication between the pressure-receiving chamber and the working fluid chamber.

In this arrangement, the periodic pressure change of the fluid filling the working fluid chamber is transmitted to the fluid filling the pressure-receiving chamber, based on the flow of the fluid passing through the orifice passage, thereby generating the oscillating force acting between the first and second mounting members. In particular, the periodic pressure change of the fluid in the working fluid chamber is effectively transmitted to the fluid in the pressure-receiving chamber, by utilizing resonance of the fluid flowing through the orifice passage, resulting in an effective generation of an oscillating force having a relatively large amplitude.

In an eleventh preferred mode of the present invention according to the ninth or tenth mode of the invention, the pneumatically operated active vibration damping device further includes an equilibrium chamber partially defined by a flexible diaphragm and filled with the non-compressible fluid, said equilibrium chamber being held in fluid communication with the fluid chamber through a fluid passage.

In this preferred mode of the active vibration damping device, the fluid is forced to flow through the fluid passage from the fluid chamber to the equilibrium chamber owing to a displacement or deformation of the flexible diaphragm, when an initial static load, such as a load of a power unit of an automotive vehicle, acts on the elastic body upon installation of the damping device to the vehicle. Therefore, a rise of the fluid pressure in the fluid chamber due to the initial static load is effectively reduced or eliminated by the transmission of the fluid through the fluid passage from the fluid chamber to the equilibrium chamber, resulting in exhibiting a desired vibration damping effect with high stability. In addition, the vibration damping device can also exhibit a passive vibration damping effect by utilizing the resonance of the fluid flowing through the fluid passage which is suitably tuned to a desired frequency band.

BRIEF DESCRIPTION OF THE DRAWINGS

The above and optional objects, features and advantages of the present invention will be better understood by reading the following detailed description of presently preferred embodiments or forms of the invention, by reference to the accompanying drawings, in which.

DETAILED DESCRIPTION OF THE PREFERRED EMBODIMETS

Figure 1:
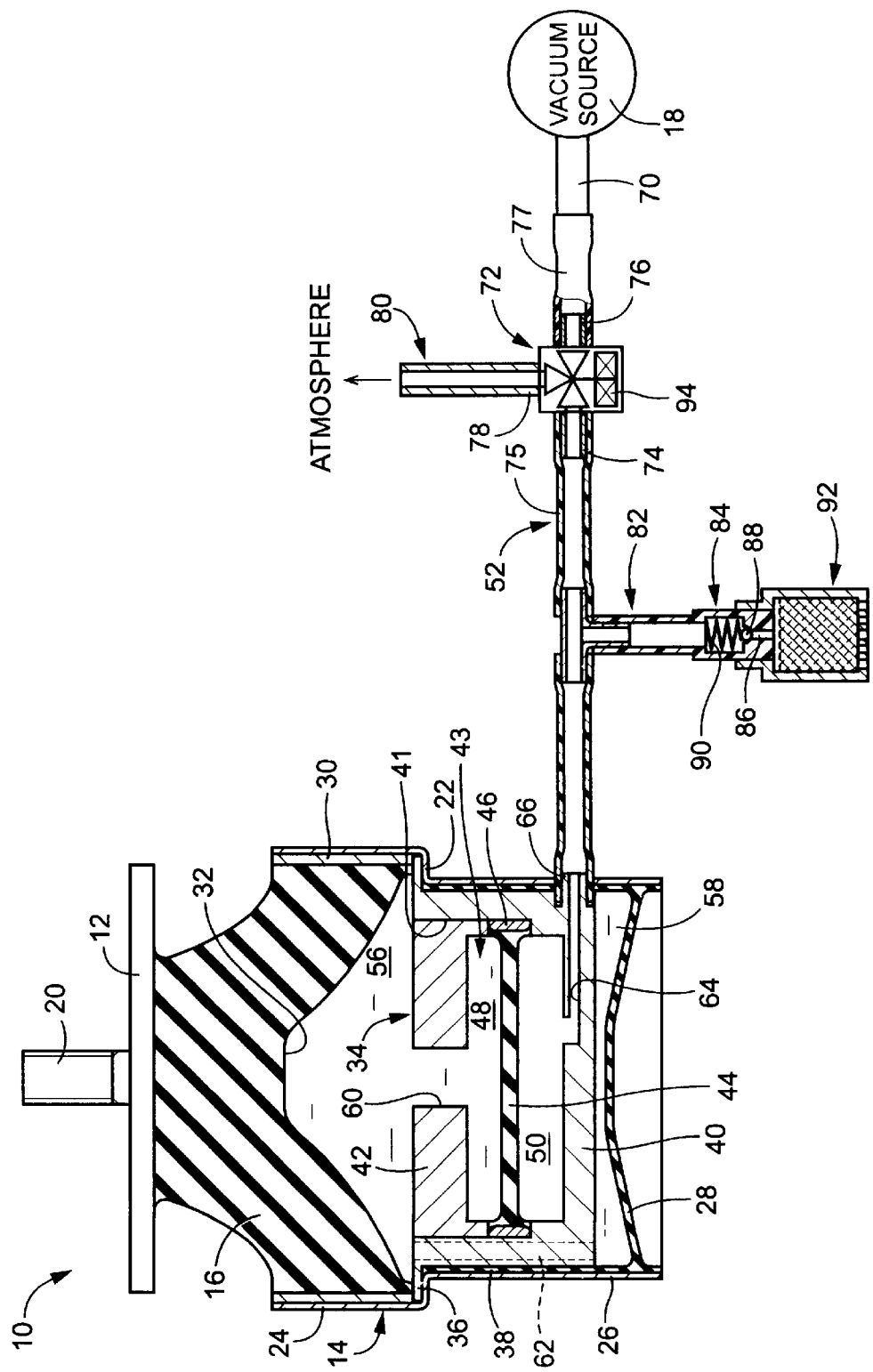
FIG. 1 is an elevational view in axial cross section of a pneumatically operated active vibration damping device in the form of an engine mount of an automotive vehicle, which is constructed according to one embodiment of this invention, together with a vacuum source used for the device.

Referring first to FIG. 1, there is illustrated the pneumatically operated active vibration damping device constructed according to a first embodiment of the present invention which includes an engine mount unit 10 and an air piping system 52 connecting the engine mount unit 10 to a vacuum source 18 and the atmosphere. The engine mount unit 10 includes a first mounting member 12 and a second mounting member 14 which are made of metallic materials and are elastically connected to each other by an elastic body 16 such that the first and second mounting members 12, 14 are spaced apart from each other by a suitable distance in a vertical direction as seen in FIG. 1. When the present engine mount unit 10 is installed on the vehicle, the first mounting member 12 is fixed to the power unit of the vehicle which includes an engine, while the second mounting member 14 is fixed to the vehicle body, so that the power unit is mounted on the vehicle body via the engine mount unit 10. The power unit is a vibration source, while the vehicle body is an object whose vibration is to be damped by the present vibration damping device. In this condition, the engine mount unit 10 is alternately connected to the vacuum source 18 and the atmosphere so as to generate and apply an oscillating force between the first and second mounting members 12, 14, so that the engine mount unit 10 is capable of eliminating or reducing the vibration to be damped by canceling the input vibration by the oscillating force, or alternatively exhibiting a reduced dynamic spring constant thereof, thereby actively exhibiting a vibration damping effect with respect to the vibration of the vehicle body.

With the engine mount unit 10 installed on the vehicle, the weight of the power unit acts between the first and second mounting members 12, 14, so that the elastic body 16 is elastically compressed in the vertical direction as seen in FIG. 1, and the first and second muting members 12, 14 are displaced toward each other by a given distance. In this condition, a primary vibrational load to be damped acts on the engine mount 10 in the vertical direction in which the first and second mounting members 12, 14 are opposed to each other.

More specifically described, the first mounting member 12 is a generally disk-shaped metallic member and has a mounting screw 20 extending upwards from its diametrically central portion. The first mounting member 12 is fixed at its mounting screw 20 to the power unit of the vehicle (not shown).

On the other hand, the second mounting member 14 is a generally cylindrical-shaped metallic member having a shoulder 22 formed at an axially intermediate portion thereof and extending in the circumferential direction. The second mounting member 12 includes a large-diameter portion 24 and a small-diameter portion 26 on the axially upper and lower sides of the shoulder 22, respectively. The lower open end of the second mounting member 14 on the side of the small-diameter portion 26 is fluid-tightly closed by a flexible diaphragm 28, which is a relatively thin-walled, flexible, rubber layer and which is bonded at its outer peripheral portion thereof to the inner circumferential surface of the small-diameter portion 26 in the process of vulcanization of a rubber material for forming the flexible diaphragm 28.

The second mounting member 14 is disposed below the first mounting member 12 with a suitable distance therebetween in the vertical direction, such that the first mounting member extends in the direction perpendicular to the center axis of the second mounting member 14. The first and second mounting member 12, 14 are elastically connected with each other by the elastic body 16 interposed therebetween. The elastic body 16 has a generally truncated conical shape and has a cavity 32 open in its large-diameter end portion. In the process of vulcanization of a rubber material for forming the elastic body 16, the small-diameter end portion of the elastic body 16 is bonded to the first mounting member 12. A cylindrical intermediate sleeve 30 made of a metallic material is bonded to the outer circumferential surface of the large-diameter end portion of the elastic body 16 also in the vulcanization process. This intermediate sleeve 30 is press-fitted into or inserted into the large-diameter portion 24 of the second mounting member 14. The large-diameter portion 24 of the second mounting member 14 is subjected to a suitable drawing operation, as needed, so that the large-diameter portion 24 is fixedly secured to the intermediate sleeve 30 which is bonded to the elastic body 16, whereby the first and second mounting members 12, 14 are elastically connected by the elastic body 16. In the thus constructed engine mount unit 10, the upper open end of the second mounting member 14 on the side of the large-diameter portion 24 is fluid-tightly closed by the elastic body 16.

With the upper and lower open end of the second mounting member 14 being fluid-tightly closed by the elastic body 16 and the diaphragm 28, respectively, a fluid chamber filled with a non-compressible fluid is formed within the second mounting member 14. The non-compressible fluid may be water, alkylene glycol, polyalkylene glycol, silicone oil, or the like. To assure an excellent vibration damping effect of the engine mount unit 10 based on a flow of the non-compressible fluid, the non-compressible fluid desirably has a viscosity not higher than 0.1 Pa·s.

Within the fluid chamber, there is disposed a partition member 34 such that the partition member 34 is located in the small diameter portion 26 of the second mounting member 14. The partition member 34 is a generally cylindrical block and includes an outward flange portion 36 protruded radially outwardly from the axially upper end portion thereof. The partition member 34 is fixedly disposed within the second mounting member 14 such that the outer circumferential surface of the partition member 34 is fixedly fitted onto the inner circumferential surface of the small-diameter portion 26, while the outward flange portion 36 of the partition member 34 is placed on the shoulder 22 and sandwiched by and between the intermediate sleeve 30 and the shoulder 22. The inner circumferential surface of the small-diameter portion 26 is substantially entirely covered by a sealing rubber layer 38, so that the partition member is fluid-tightly fitted onto the inner circumferential surface of the small-diameter portion 26 via the sealing rubber layer 38 interposed therebetween.

The partition member 34 divides the fluid chamber into two sections on the axially opposite sides thereof, namely, a pressure-receiving chamber 56 partially defined by the elastic body 16 and an equilibrium chamber 58 partially defined by the flexible diaphragm 28. The pressure-receiving chamber 56 and the equilibrium chamber 58 are held in fluid communication with each other through a fluid passage 62 (which will be described later) formed through the partition member 34 so as to extend in the axial direction thereof. Upon application of a vibrational load to the engine mount unit 10, the pressure of the fluid in the pressure-receiving chamber 56 varies due to the elastic deformation of the elastic body 16, while the volume of the equilibrium chamber 58 is permitted to vary by displacement of the diaphragm 42, for thereby absorbing a fluctuation of the pressure of the fluid in the pressure-receiving chamber.

The partition member 34 includes a bottom member 40 in the form of a generally cylindrical metallic member having a center hole 41 open in its upper end face, and a closure member 42 in the form of a disk-like shaped metallic member. The closure member 42 is forcedly pressed into the center hole 41 of the bottom member 40 so as to fluid-tightly close the opening of the center hole 41. Thus, the center hole 41 and the closure member 42 cooperate to define an interior space 43 fluid-tightly enclosed within the bottom member 40.

Within the interior space 43, there is disposed a thin deformable rubber plate 44 having a disk-like shape, as a oscillating member, which is located at an axially intermediate portion of the interior space 43 and extends in the direction perpendicular to the axial direction. The thickness of the rubber plate 47 is determined so as to exhibit sufficient elasticity thereof so that the rubber plate 47 is held in its original or neutral position in which the rubber plate 47 has substantially no internal strain. An annular ring member 46 is bonded to an outer peripheral portion of the rubber plate 47 in the process of vulcanization of a rubber material for forming the rubber plate 47. This annular ring member 46 is press fitted onto an axially intermediate portion of the inner circumferential surface of the bottom member 40, so that the rubber plate 47 extends in the direction perpendicular to the axial direction, whereby the interior space 43 of the partition member 34 is fluid-tightly divided by the rubber plate 47 into two sections on the opposite sides of the rubber plate 47. More specifically, the rubber plate 47 cooperates with the closure member 42 to define an oscillating fluid chamber 48 as a working fluid chamber filled with the non-compressible fluid. The rubber plate 47 also cooperates with the bottom member 40 to define a fluid-tightly closed working air chamber 50.

The working air chamber 50 is connected with an air piping system 52 which is adapted to connect the working air chamber 50 to the vacuum source 18 and the atmosphere, and which is independent of the engine mount unit 10. In this condition, a periodic change of the air pressure is applied to the working air chamber 50 through the air piping system 52 so that the rubber plate 44 is elastically oscillated by the periodic change of the air pressure in the working air chamber 50, thereby, thereby inducing a pressure change of the fluid in the oscillating fluid chamber 48.

The closure member 42 of the partition member 34 is formed at its center portion with an orifice passage 60 extending therethrough. The orifice passage 60 serves for a fluid communication between the pressure-receiving chamber 56 and the oscillating fluid chamber 48. When the rubber plate 44 is oscillated by the periodic change of the air pressure in the working air chamber 50, the periodic change of the fluid pressure is generated in oscillating fluid chamber 48. The fluid filling the oscillating fluid chamber 48 is forced to flow through the orifice passage 60 to the pressure-receiving chamber 56 due to the pressure difference between the fluid in the oscillating fluid chamber 48 and the fluid in the pressure-receiving chamber 56, resulting in effective transmission of the fluid pressure change from the oscillating fluid chamber 48 to the pressure-receiving chamber 56. The length and the cross section of the orifice passage 60 are suitably determined so that the amount of flow of the fluid passing through the orifice passage 60 can be effectively increased by the oscillation of the rubber plate 47 based on the resonance of the fluid flowing through the orifice passage 60, resulting in effective transmission of the periodic pressure change of the fluid from the oscillating fluid chamber 48 to the pressure-receiving chamber 56.

As mentioned above, the partition member 34 is also formed with the fluid passage 62 through which the pressure-receiving chamber 56 and the equilibrium chamber 58 are held in fluid communication with each other. The length and the cross section of the fluid passage 62 is also suitably determined so that the vibration damping device exhibits a passive vibration damping effect with respect to a low-frequency vibration, or exhibits a passive vibration isolating effect with respect to a high-frequency vibration, based on a resonance of the fluid flowing through the fluid passage 62. The provision of the fluid passage 62 permits the flow of the fluid between the pressure-receiving chamber 56 and the equilibrium chamber 58 upon elastic deformation of the elastic body 16 due to the weight of the power unit, eliminating undesirable pressure change of the pressure-receiving chamber 56, and preventing a resultant significant change of the spring characteristics of the mount unit 10 due to the pressure change of the pressure-receiving chamber 56.

The bottom member 40 of the partition member 34 includes an air passage 64 formed in its bottom wall extending therethrough in the radial direction. The air passage 67 is open at one of its both ends in the working air chamber 50 and at the other end in the outer circumferential surface of the bottom member 40 at which a connector 66 is integrally formed so as to extends radially outwardly through the second mounting member 14. The air piping system 52 is connected to the connector 66, so that the periodic change of the air pressure in the working air chamber 50 is induced by alternatively connecting the working air chamber 50 to the atmosphere and the vacuum source 18. Thus, the rubber plate 44 is oscillated based on the periodic change of the air pressure in the working air chamber 50 applied thereto, thereby inducing a pressure change of the fluid in the oscillating fluid chamber 48.

The air piping system 52 is an air conduit for connecting the connector 66 to an output connector 70 of the vacuum source 18 and the atmosphere, and is made of a suitable material resistive to the negative pressure applied thereto, such as a metallic material and a synthetic resin material. The air piping system 52 includes a solenoid operated switch valve 72 disposed in an axially intermediate portion thereof. It is preferable that the switch valve 72 is a solenoid-operated switch valve of poppet or spool type having an electromagnetic actuator 94, which permits a switching operation at a high velocity, e.g., some dozens of times per minute, according to an electric control signal. The switch valve 72 is a three-port directional control valve having a first port 74 connected to a mount-side conduit 75 communicating with the engine mount unit 10, a second port 76 connected to a vacuum conduit 77 communicating with the vacuum source 18, and a third port 78 connected to an atmospheric conduit 80 communicating with the atmosphere. In this respect, the switch valve 72 has two operating positions, namely a "vacuum position" for communication of the working air chamber 50 with the vacuum source 18, and an "atmospheric position" for communication of the working air chamber 50 with the atmosphere. It is preferable that the vacuum source 18 is a vacuum tank or an accumulator, communicating with the air intake system of an internal combustion engine.

The switch valve 72 is operated at a suitable frequency for alternatively connecting and disconnecting the working air chamber 50 to and from the vacuum source 18 and the atmosphere, so that the negative pressure and the atmospheric pressure is alternately applied to the working air chamber 50, resulting in a periodic change of the air pressure in the working air chamber 50 at a frequency corresponding to the frequency at which the switch valve 72 is alternately placed in the vacuum position and the atmospheric position. The rubber plate 44 is oscillated by the periodic change of the air pressure in the working air chamber 50 applied thereto, thereby generating a periodic change of the fluid in the oscillating fluid chamber 48. As is apparent from the forgoing description, the air piping system 52 and the working air chamber 50 cooperate to define a negative pressure applied region in the present embodiment.

The air piping system 52 further includes a branched conduit 82 as an atmosphere introducing passage, which is branched from a portion of the mount-side conduit 75, that is, a portion of the air piping system 52 between the engine mount unit 10 and the switch valve 72. At the open end of the branched conduit 82, there is connected a pressure-regulating valve 84 such that the branched conduit 82 is connectable to the atmosphere through the pressure-regulating valve 82. The pressure-regulating valve 82 is adjusted to be automatically opened to connect the branched conduit 82 to the atmosphere, when the negative pressure level in the air piping system 52 increases and exceeds the predetermined negative pressure level, so that the excess negative pressure is automatically relieved by the introduction of the atmosphere via the pressure-regulating valve 82, whereby the level of the negative pressure applied to the air piping system 52 and the working air chamber 50 is effectively regulated, namely is held to be equal to or lower than the predetermined level. As illustrated in FIG. 1, the pressure-regulating valve 82 includes a valve bore 86 having a circular shape in cross section and opening at one of opposite open end to the atmosphere and at the other open end in the in the branched conduit 82, a ball-shaped valve member 88, and a coil spring 90 adapted to bias the valve member 88 to the open end of the valve bore 86 on the side of the branched conduit 82 so as to close the open end of the valve bore 86. In the condition as seen in FIG. 1, the valve member 88 is forcedly placed on the branched conduit-side open end of the valve bore 86 by the biasing force of the coil spring 90, since a retracting force applied to the valve member 88 based on the difference between the negative pressure in the air piping system and the atmosphere, is insufficient to move the valve member 88 in a direction away from the valve bore 88 against the biasing force. That is, the negative pressure level in the air piping system is lower than the predetermined negative pressure level. When the negative pressure in the air piping system increases and exceeds the predetermined negative pressure level, on the other hand, the retracting force applied to the valve member 88 is sufficient to move the valve member 88 against the biasing force in the direction away from the valve bore 88, that is, toward the branched conduit 82, so that an amount of atmosphere is introduced into the branched conduit 82 and applied to the working air chamber 52. Thus, the level of the negative pressure applied to the working air chamber 50 is effectively made lower than the predetermined negative pressure level (closer to the atmospheric pressure).

In the pressure-regulating valve constructed as described above, the predetermined negative pressure level may be optionally determined by adjusting the biasing force of the coil spring 90 applied to the valve member 88, the length and the diameter of the valve bore 86, and the like.

In addition, the atmosphere-side open end of the valve bore 86 is fixed with a silencer 92. Upon operation of the pressure-regulating valve 84, the atmosphere is introduced into the branched conduit 82 through the silencer 92 and the valve bore 86 in this order. The provision of the silencer 92 is effective to eliminate or reduce the problem of the noise caused by a resonance of the air flowing through the valve bore 86 at a relatively-high velocity upon opening of the pressure-regulating valve 84. The silencer 92 may be of a glass wool type, a resonance type, an interference type, a cavity type or any other conventional types.

With the engine mount unit 10 and the air piping system 52 installed on the automotive vehicle, the electromagnetic actuator 94 of the switch valve 72 is actuated according to an electric driving signal applied thereto through a lead. The electric driving signal is corresponding to the vibration to be damped. That is, the frequency and phase of the driving signal correspond to the frequency and phase of the vibration to be damped. Preferably, the control signal may be an ignition pulse signal detected from the internal combustion engine and other signals corresponding to the vibration to be damped, which are detected by suitable sensors. Thus, the switch valve 72 is operated according to the electric driving signal corresponding to the vibration to be damped, causing a periodic change of the air pressure in the working air chamber 50 at a frequency corresponding to that of the vibration to be damped. The periodic change of the air pressure in the working air chamber 50 causes the oscillation of the rubber plate 47 at the same frequency, thereby generating a periodic change of the fluid pressure in the oscillating fluid chamber 48 at a frequency corresponding to the vibration to be damped. The periodic change of the fluid pressure in the oscillating fluid chamber 48 is transmitted to the pressure-receiving chamber 56 by the flow of the fluid passing thought the orifice passage 60, thereby applying an oscillating force whose frequency corresponds to the vibration to be damped, between the first and second mounting members 12, 14, that is, between the power unit and the vehicle body.

In the present embodiment, the internal combustion engine may be a direct-injection type, which includes selective combustion modes, namely, a stratified charge combustion mode and a stoichiometric combustion mode. When the internal combustion engine selects its stoichiometric combustion mode, the negative pressure in the vacuum source 18 increases (the absolute value of the negative pressure is made large), whereas when the internal combustion engine selects its stratified charge combustion mode, the negative pressure in the vacuum source 18 decreases (the absolute value of the negative pressure is made small). This means that the value of the negative pressure in the vacuum source 18 varies depending upon the combustion conditions of the direct-type internal combustion engine.

In view of the above-indicated characteristic of the vacuum source 18, the predetermined negative pressure level used for operating the pressure-regulating valve 84 is determined to a suitable level which is substantially equal to or slightly lower or higher than that of the negative pressure in the vacuum source 18 in the stratified charge combustion operation of the internal combustion engine, in the present embodiment. This arrangement permits an effective application of the negative pressure to the working air chamber 50 in the stratified charge combustion operation of the engine. Therefore, the periodic change of the air pressure in the working air chamber 50 has a desired amplitude, owing to the alternative application of the atmosphere and the negative pressure in the vacuum source 18 by the switching operation of the switch valve 72, thereby oscillating the rubber plate 47 at a desired amplitude. Accordingly, the periodic pressure change of the fluid filling the pressure oscillating fluid chamber 48 is induced at a desired amplitude, that is transmitted to the pressure-receiving chamber 56, thereby actively generating the oscillating force at the desired amplitude corresponding to the pressure difference between the atmosphere and the negative pressure applied to the working air chamber 50.

When the engine is operated in the stoichiometric combustion mode, on the other hand, the pressure-regulating valve 84 disposed on the air piping system 52 is operated or opened due to an application of the high-negative pressure the level of which is higher than the predetermined negative pressure level. That is, the pressure-regulating valve 84 is operated to introduce the atmosphere to the air piping system 52 so that the level of the negative pressure applied to the working air chamber 50 is made lower than the predetermined level. Accordingly, the amplitude of the pressure change of the fluid in the pressure-receiving chamber 56 and the amplitude of the resultant oscillating force applied between the first and second mounting members 12, 14 are effectively reduced, eliminating or reducing a conventionally experienced problem of a significantly increased oscillating force and the deterioration of the vibration condition due to the significantly increased oscillating force.

The vibration damping device constructed according to the first embodiment of the present invention, is capable of generating an effective oscillating force, irrespective of the combustion mode or condition of the internal combustion engine. Therefore the present vibration damping device can exhibit active vibration damping effect with high stability, by applying this effective oscillating force to the vehicle body so as to actively cancel or absolve the vibration of the vehicle body with the oscillating force. Alternatively, the vibration damping device of the present embodiment can exhibit an active vibration isolating effect, by actively reducing an amount of change of the pressure of the fluid in the pressure-receiving chamber 56 for reducing the spring stiffness of the engine mount unit 10. It is desirable that the engine mount unit 10 is arranged to exhibit the above-indicated active vibration damping effect or active vibration isolating effect, with respect to the vibration whose frequency band is sufficiently higher than the frequency band to which the fluid passage 62 is tuned. This arrangement permits the vibration damping device of the present embodiment exhibit a desired vibration damping effect, without adverse influence of the flow of the fluid flowing through the fluid passage 62.

During the stoichiometric combustion operation of the engine, the negative pressure in the vacuum source 18 is increased (the absolute value of the negative pressure is made large), while the magnitude of the vibration to be damped is likely to be small. In this case, the pressure-regulating valve 84 is operated to introduce the atmosphere into the air piping system 52, so that the low-negative pressure is applied to the working air chamber 50, resulting in a sufficiently small oscillating force. Thus, the present vibration damping device is capable of preventing a generation of an unnecessarily large oscillating force. Therefore, even if the vibration damping device of the present embodiment is tuned to the vibration generated upon the stratified charge combustion operation of the engine where the level of the negative pressure is low and the amplitude of the vibration to be damped is likely to be large, the vibration damping device is capable of exhibiting a desired damping effect with respect to the vibration generating upon the stratified charge combustion operation of the engine, since the excess negative pressure in the air piping system 52 during the stratified charge combustion operation of the engine is effectively relieved by the introduction of the atmosphere therein by means of the pressure-regulating valve 82.

Figure 3:
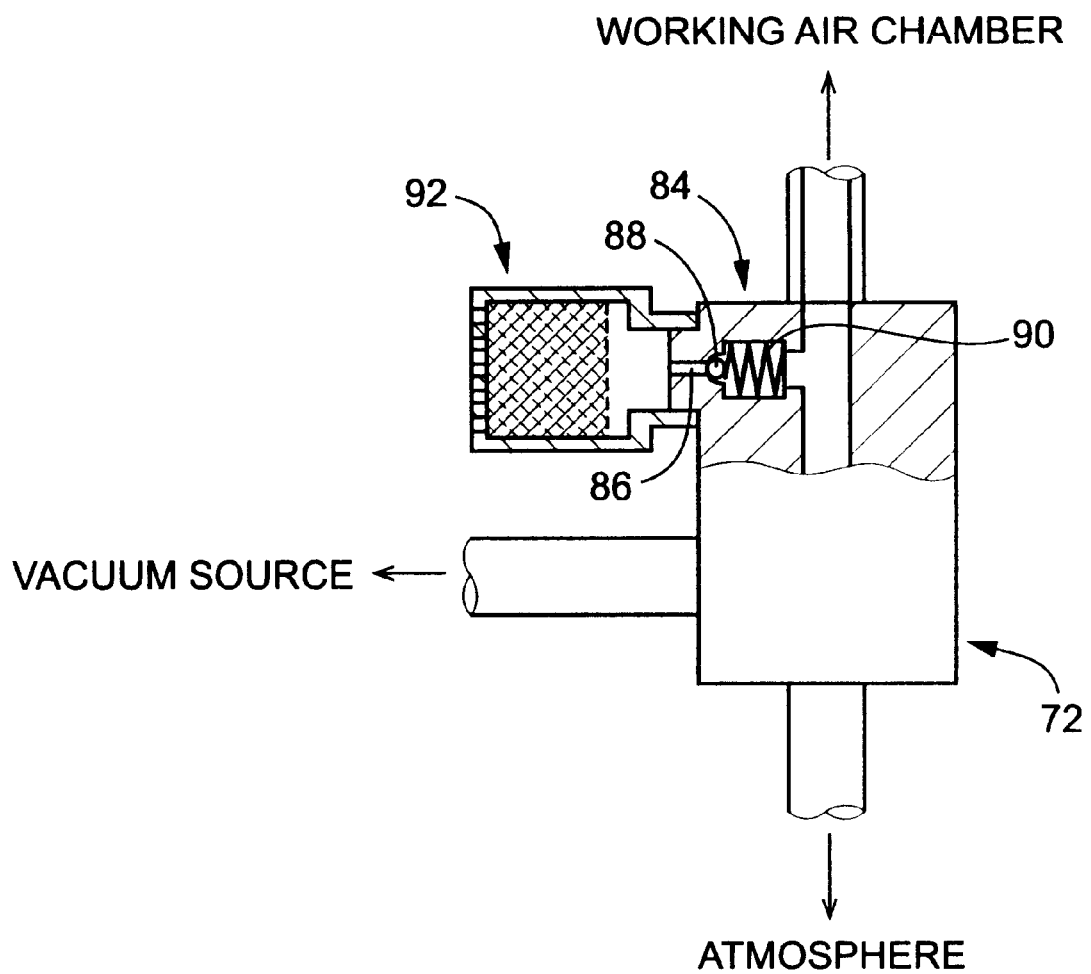
FIG. 3 is a fragmentally view partially in cross section of a pneumatically operated active vibration damping device in the form of an engine mount constructed according to another preferred embodiment of the invention.

The vibration damping device of the present embodiment is operated and actual oscillating forces generated during the stoichiometric and the stratified charge combustion operations of the engine were measured with respect to a plurality of pressure-regulating valves 84 which are different in diameters of the valve bores 88 thereof. The measurements are indicated in the graph of FIG. 3 (see a solid line). It is noted that the actual oscillating forces were measured under the conditions that the vacuum source 18 provides the negative pressure having a value of −500 mmHg in the stoichiometric combustion operation of the engine, and the negative pressure having a value of −200 mmHg in the stratified charge combustion operation of the engine, and that the solenoid operated switch valve 72 is operated at a frequency of 40 Hz for alternatively connecting and disconnecting the working air chamber 50 to and from the vacuum source 18 and/or the atmosphere. Further, the diameters of the valve bores 86 vary within a range between 0.5 mm–3.5 mm, while the biasing force of the coil spring 90 is made constant.

Figure 2:
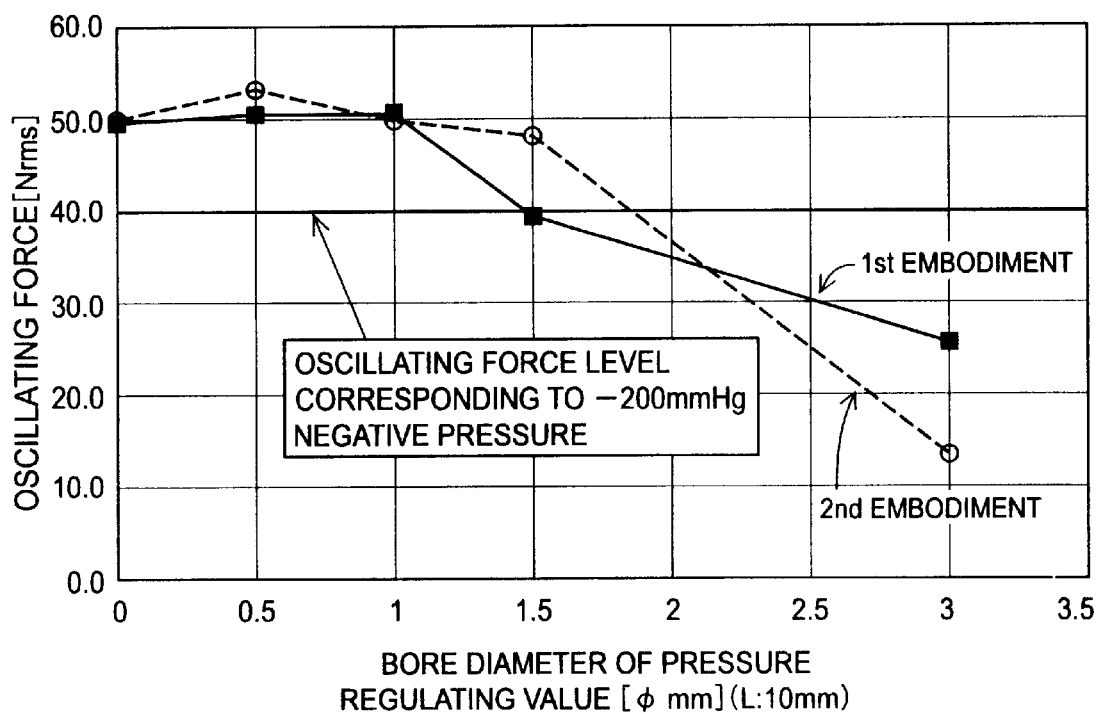
FIG. 2 is a graph indicating a measured oscillating force generated when a diameter of a bore of a pressure-regulating valve is varied in the engine mount unit of FIG. 1, and in the modified engine mount unit of FIG. 1.

As is apparent from the graph of FIG. 2, the vibration damping device of the present embodiment can generate a desired oscillating force, and accordingly can exhibit a desired damping effect, with respect to both of the vibrations generated upon the stoichiometric and the stratified charge combustion operations of the engine, even in the case where the negative pressure in the air intake system of the direct-injection type internal combustion engine is utilized as the vacuum source 18. The measurements also reveals that the magnitude of the oscillating force of the vibration damping device can be easily adjusted by changing the diameter of the valve bore 88 of the pressure-regulating valve 84.

The vibration damping device constructed according to the first embodiment, may be modified to have a pressure regulation-restricting device for optionally prohibiting the operation of the pressure-regulating valve 84. This pressure regulation-restricting device is operated for allowing the operation of the pressure-regulating valve 84 in the stoichiometric combustion condition of the engine, and for prohibiting the operation of the pressure-regulating valve 84 in the stratified charge combustion condition of the engine. The modified type vibration damping device of the first embodiment of the present invention is operated under the condition indicated above, and actual oscillating forces generated during the stoichiometric and the stratified charge combustion of the engine were measured with respect to the plurality of pressure-regulating valves 84 which are different in diameters of the valve bores 88 thereof. The measurements are also indicated in the graph of FIG. 2 (see a solid line). As is apparent from the graph of FIG. 2, the vibration damping device can generate a constant oscillating force during the stratified charge combustion operation of the engine, since the negative pressure having a value of −200 mmHg generated in the vacuum source 18 is stably applied to the working air chamber 50. During the stoichiometric combustion of the engine, on the other hand, the vibration damping device can generate the oscillating force which is made substantially smaller than that generated in the stratified charge combustion operation of the engine, provided that the diameter of the valve bore 86 of the pressure-regulating valve 84 is made larger (larger than 1.5 mm in the present embodiment) so that the absolute value of the negative pressure applied to the working air chamber 50 is made substantially smaller than that of the negative pressure during the stratified charge combustion operation of the engine.

This modified type of the vibration damping device of the first embodiment permits further improved damping effect with respect to both of the vibration under the stratified charge combustion condition of the engine where the magnitude of the vibration is large while the available negative pressure force is small, and the vibration under the stoichiometric combustion condition of the engine where the magnitude of the vibration is small while the available negative pressure force is large. The pressure regulation restricting device provided in the present vibration damping device is not particularly limited to any specific device, but may preferably be constituted by a switch valve disposed on the branched conduit 82 of the air piping system 52 so as to alternatively connect and disconnect the pressure-regulating valve 84 to and from the air piping system 52.

In the vibration damping device constructed according to the first embodiment, the branched conduit 82 and the pressure-regulating valve 84 is connected to a portion of the air piping system 52 between the switch valve 72 and the working air chamber 50. This arrangement assures that the vacuum source 18 is disconnected from the pressure-regulating valve 84 during the switch valve 72 is placed in its atmospheric position for communication between the working air chamber 50 and the atmosphere, avoiding a continuous communication between the vacuum source 18 and the pressure-regulating valve 84, eliminating or reducing a problem of an undesired reduction in the negative pressure level in the vacuum source 18 due to the operation of the pressure-regulating valve 84 so as to reduce the negative pressure level (to reduce the absolute value of the negative pressure). Therefore, the provision of the pressure-regulating valve 84 in the vibration damping device is less likely to make an adverse influence on the vacuum source 18 and the other equipment or devices of the vehicle which utilize the negative pressure in the vacuum source 18.

In the vibration damping devices of the first and second embodiments, the branched conduit 82 and the pressure-regulating valve 84 are disposed on a portion of the air piping system 52 between the switch valve 72 and the working air chamber 50. Alternatively, the branched conduit 82 and the pressure-regulating valve 84 may be disposed on a portion of the air piping system 52 between the vacuum source 18 and the switch valve 72. The thus constructed vibration damping device as a second embodiment of the present invention permits a constant level of the negative pressure applied to the air piping system 52, which level is substantially not higher than the predetermined negative pressure level, resulting in a stable application of the negative pressure having a desirably regulated level to the working air chamber 50.

The vibration damping device constructed according to the second embodiment of the present invention where the branched conduit 82 and the pressure-regulating valve 84 is disposed between the vacuum source 18 and the switch valve 72, rather than between the switch valve 72 and the working air chamber 50, is also operated under the same condition as in the first embodiment and actual oscillating forces generated during the stoichiometric and the stratified charge combustion of the engine were measured with respect to a plurality of pressure-regulating valves 84 which are different in diameters of the valve bores 88 thereof. The measurements are also indicated in the graph of FIG. 3 (see a broken line). The measurements indicated in the graph of FIG. 3 shows that the vibration damping device of the second embodiment can exhibits an vibration damping effect similar to that of the first embodiment, even in the case where the branched conduit 82 and the pressure-regulating valve 84 is disposed between the vacuum source 18 and the switch valve 72.

It is noted that the pressure-regulating valve 84 may be disposed any portion of the negative pressure applied region, and is not necessarily disposed on a portion of the air piping system 52.

Figure 4:
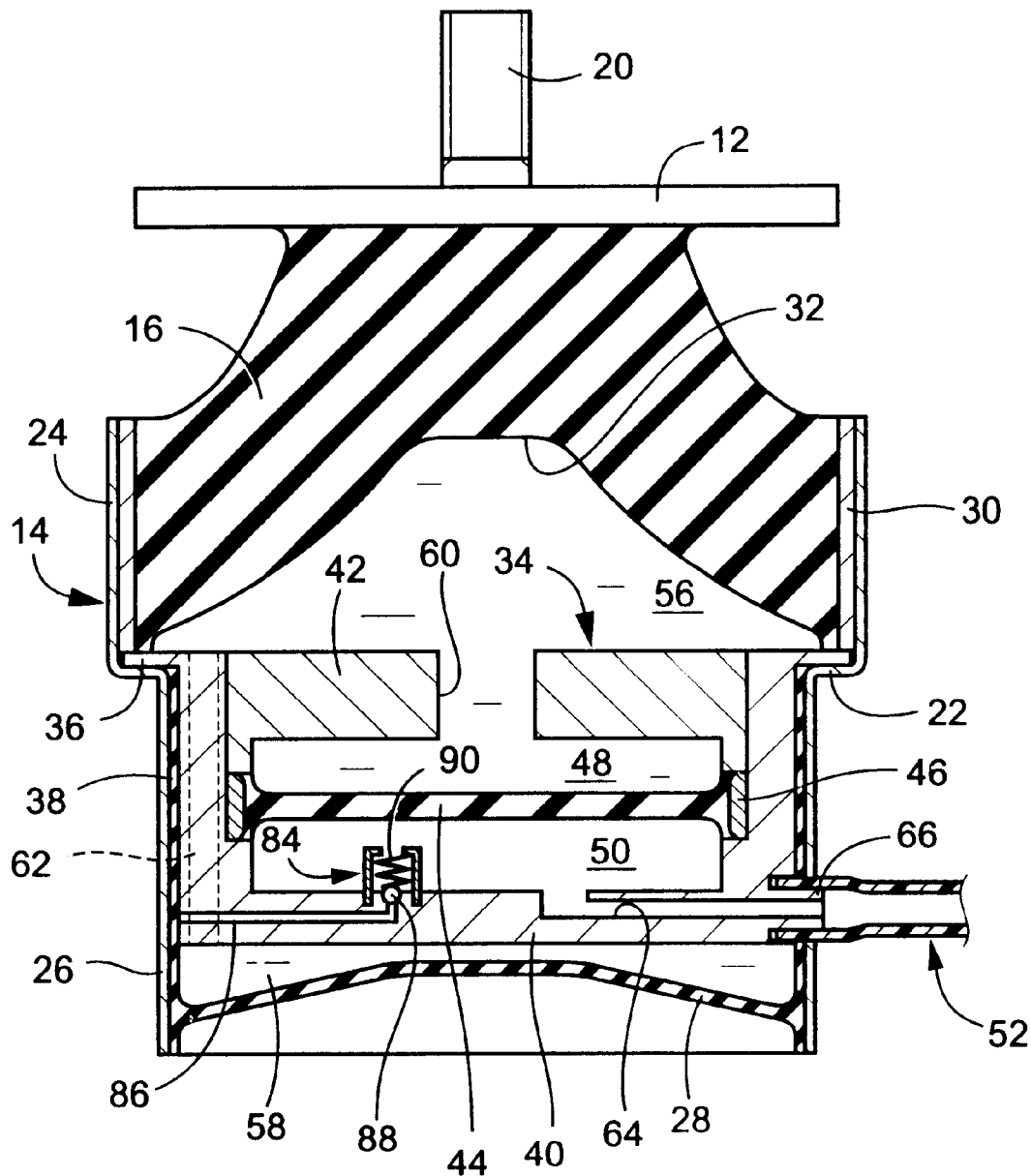
FIG. 4 is an elevational view in axial cross section of an engine mount unit of a pneumatically operated active vibration damping device in the form of an engine mount constructed according to a yet another preferred embodiment of the invention.

Referring next to FIGS. 3 and 4, there are illustrated fragmental views of vibration damping devices constructed according to the third and fourth embodiments of the present invention, respectively. In these embodiments, the reference numerals used in the preceding embodiment will be used to identify the corresponding elements, and no description of these elements will be provided.

In the vibration damping device constructed according to the third embodiment of the present invention, as shown in FIG. 3, the pressure-regulating valve 84 is integrally formed within the switch valve 72. In the vibration damping device constructed according to the fourth embodiment of the present invention, the pressure-regulating valve 84 is integrally formed within the engine mount unit 10.

While the silencer 92 is connected to the atmosphere-side open end of the valve bore 86 of the pressure-regulating valve 84 in the above-indicated embodiments, the silencer 92 may be eliminated.

Alternatively, the pressure-regulating valve 84 may be connected to a portion of the atmospheric conduit 80 connected to the third port 78 of the switch valve 72 so that the atmosphere is introduced from the pressure-regulating valve 84 into the air piping system 52 through the atmospheric conduit 80. In this arrangement, the atmospheric conduit 80 functions as a muffler or silencer, effectively reducing or eliminating the noise generated when the atmosphere is introduced into the air piping system 52 through the pressure-regulating valve 84. This type of vibration damping device may further be modified such that the silencer 92 is disposed on a portion of the atmospheric conduit 80. In this case, the silencer 92 is capable of eliminating or reducing both of the noise generated when the atmosphere is applied through the switch valve 72 into the air piping system 52, and the noise generated when the atmosphere is applied through the pressure-regulating valve 84 into the air piping system 52.

While the presently preferred embodiments of this invention have been described in detail, for illustrative purpose only, it is to be understood that the present invention is not limited to the details of the illustrated embodiments, but may be otherwise embodied.

In the vibration damping devices of the illustrated embodiments, the oscillation of the rubber plate 44 initially acts on the oscillating fluid chamber 48, and then is transmitted to the pressure-receiving chamber 56 via the flow of the fluid through the orifice passage 60 between the these chambers 48, 56. It may be possible to constitute the pressure-receiving chamber 56 partially defined by the rubber layer 44 and the oscillation of the rubber plate 44 directly acts on the pressure-receiving chamber 56 so as to generate a pressure change of the fluid in the pressure-receiving chamber 56, without using the orifice passage 60 and the oscillating fluid pressure 48.

Further, the fluid chamber filled with a non-compressible fluid is not an essential element in the present invention. For instance, the engine mount according to the present invention may be constructed such that the periodic change of the air pressure in the working air chamber is directly applied between the first and second mounting members 12, 14 so as to generate the oscillating force therebetween.

In the illustrated embodiments, the present invention is applied to one type of the engine mount wherein the first and second mounting members 12, 14 are opposite to each other with a suitable amount of spacing, in one direction, e.g., a vertical direction. The present invention may be applicable to other types of the engine mounts, for instance, to a engine mount for a FF (front-engine/front-drive) motor vehicle, which includes an inner sleeve member as a first mounting member and an outer sleeve member as a second mounting member disposed radially outwardly of the inner sleeve member, that are elastically connected with each other by an elastic body interposed therebetween.

In addition, the principle of the present invention is applicable not only an engine mount for mounting an engine of an automotive vehicle on the vehicle body in a vibration damping manner, but also other active-type vibration damping devices for automotive vehicles, such as body mounts, and differential mounts, and various kinds of active-type vibration damping devices for various devices or equipment other than the automotive vehicles.

It is to be understood that the present invention may be embodied with various other changes, modifications and improvements, which may occur to those skilled in the art, without departing from the spirit and scope of the invention defined in the following claims:

What is claimed is:

1. A pneumatically operated active vibration damping device interposed between two members of a vibration system for connecting said two members in a vibration damping manner, said active vibration damping device comprising:

a first and a second mounting member which are spaced apart from each other and are attachable to said two members of said vibration systems, respectively;

an elastic body elastically connecting said first and second mounting members;

a working air chamber adapted to apply an oscillating force between said first and second mounting members based on a periodic change of an air pressure in said working air chamber;

an air piping system which is connected to said working air chamber and which is cooperate with said working air chamber to define a negative pressure applied region;

a switch valve which is connected to said air piping system and which is operable for connecting said air chamber alternately to a vacuum source and an atmosphere for thereby causing said periodic change of said air pressure in said working air chamber; and at least one pressure-regulating valve which is connected to said negative pressure applied region and which is operable for introducing said atmosphere into said negative pressure applied region, when a level of said negative pressure in said negative pressure applied region is higher than a predetermined level of said negative pressure, for thereby adjusting said level of said negative pressure applied to said working air chamber.

2. A pneumatically operated active vibration damping device according to claim 1, wherein said pressure-regulating valve is connected to a portion of said negative pressure applied region between said switch valve and said working air chamber.

3. A pneumatically operated active vibration damping device according to claim 1, wherein said pressure-regulating valve is connected to a portion of said negative pressure applied region between said switch valve and said vacuum source.

4. A pneumatically operated active vibration damping device according to claim 1, wherein said air piping system includes an atmosphere introducing passage connected to said pressure-regulating valve for introducing said atmosphere to said negative pressure applied region through said pressure-regulating valve, and an atmospheric conduit connected to said switch valve for communicating said negative pressure regulating region with said atmosphere, said atmosphere introducing passage is connected to said atmospheric conduit, for thereby introducing said atmosphere to said pressure-regulating valve through said atmospheric conduit.

5. A pneumatically operated active vibration damping device according to claim 1, wherein said air piping system includes an atmosphere introducing passage connected to said pressure-regulating valve for introducing said atmosphere to said negative pressure applied region through said pressure-regulating valve, said active vibration damping device further comprising a silencer which is disposed in said atmosphere introducing passage.

6. A pneumatically operated active vibration damping device according to claim 1, wherein said pressure-regulating valve is fixedly incorporated in said switch valve.

7. A pneumatically operated active vibration damping device according to clam 1, wherein said first and second mounting members and said elastic body elastically connecting said first and second mounting members constitute a mount unit, said air piping system is independent of said mount unit, and said pressure-regulating valve is fixedly incorporated in said mount unit.

8. A pneumatically operated active vibration damping device according to claim 1, wherein said first and second mounting members and said elastic body elastically connecting said first and second mounting members constitute a mount unit, said air piping system is independent of said mount unit, and said switch valve is connected to a portion of said air piping system remote from said mount unit.

9. A pneumatically operated active vibration damping device according to claim 1, wherein said vacuum source comprises a negative pressure generated in an air intake system of an internal combustion engine which selectively adopts a stratified charge combustion mode and a stoichiometric combustion mode for fuel-combustion operation thereof.

10. A pneumatically operated active vibration damping device according to claim 9, wherein said predetermined level of said negative pressure is lower than a level of said negative pressure in said negative pressure applied region when said internal combustion engine adopts said stoichiometric combustion mode.

11. A pneumatically operated active vibration damping device according to claim 1, further comprising a pressure regulation restricting device which is operable to restrict operation of said pressure-regulating valve as needed.

12. A pneumatically operated active vibration damping device according to claim 11, wherein said vacuum source comprises a negative pressure generated in an air intake system of an internal combustion engine which selectively adopts a stratified charge combustion mode and a stoichiometric combustion mode for fuel-combustion operation thereof, said pressure regulation restricting device being operated when said engine adopts said stratified charge combustion mode.

13. A pneumatically operated active vibration damping device according to claim 1, wherein said at least one pressure-regulating valve includes a valve bore communicating at one of opposite open end with said atmosphere and at the other open end with said negative pressure applied region, a valve member movable toward and away from said open end of said valve bore on the side of said negative pressure applied region, and a coil spring adapted to bias said valve member to said open end of said valve bore on the side of said negative pressure applied region so as to fluid-tightly close said open end of said valve bore, said coil spring being adjusted to exhibit a suitable biasing force so that the valve member is moved away from said open end of said valve bore against said biasing force, when said level of said negative pressure in said negative pressure applied region is higher than said predetermined level of said negative pressure.

14. A pneumatically operated active vibration damping device according to claim 1, further comprising: a fluid chamber partially defined by said elastic body, which is disposed between said first and second mounting members, and which is filled with a non-compressible fluid; and a movable member partially defining said fluid chamber on one of opposite sides thereof and said working air chamber on the other side thereof which is remote from said fluid chamber, said movable member being oscillated by said periodic change of said air pressure in said working air chamber so as to induce a pressure change of said fluid in said fluid chamber, for thereby generating the oscillating force between said first and second mounting members.

15. A pneumatically operated active vibration damping device according to claim 14, wherein said movable member comprises an elastic member which provides an elastic force for restoring said movable member to an original position thereof.

16. A pneumatically operated active vibration damping device according to claim 14, further comprising: a partition member supported by said second mounting member and adapted to fluid tightly divide said fluid chamber into a pressure-receiving chamber partially defined by said elastic body on one of opposite sides thereof, to which a vibrational load is applied, and a working fluid chamber partially defined by said movable member on the other opposite surface of said partition member to which said oscillating force is applied; an orifice passage formed through said partition member and allowing a fluid communication between said pressure-receiving chamber and said working fluid chamber.

17. A pneumatically operated active vibration damping device according to claim 14, further comprising an equilibrium chamber partially defined by a flexible diaphragm and filled with said non-compressible fluid, said equilibrium chamber being held in fluid communication with said fluid chamber through a fluid passage.

18. A pneumatically operated active vibration damping device according to claim 16, further comprising an equilibrium chamber partially defined by a flexible diaphragm and filled with said non-compressible fluid, said equilibrium chamber being held in fluid communication with any one of said pressure receiving chamber and said working fluid chamber through a fluid passage, said fluid passage being tuned to a frequency band lower than the frequency band to which said orifice passage being tuned.

19. A pneumatically operated active vibration damping device according to claim 1, wherein said second mounting member is a generally cylindrical member and having axially opposite open ends which are fluid tightly closed by said elastic body and a flexible diaphragm, respectively, for thereby defining a fluid-tight space filled with a non-compressible fluid, which is fluid-tightly enclosed within said second mounting member, said active vibration damping device further comprising: a partition member fixedly disposed within said fluid-tight space and fluid-tightly dividing said fluid-tight space into a pressure-receiving chamber partially defined by said elastic body on one of opposite sides thereof, and an equilibrium chamber partially defined by said flexible diaphragm on the other side thereof; and an fluid passage formed through the partition member for a fluid communication between said pressure-receiving chamber and said equilibrium chamber, said partition member a fluid-tight interior space, said movable member fixedly disposed within said fluid-tight interior space of said partition member and adapted to fluid tightly divide said fluid-tight interior space into a working fluid chamber on one of opposite sides thereof and said working air chamber on the other side thereof which is remote from said pressure-receiving chamber, said movable member being oscillated by said periodic change of said air pressure in said working air chamber so as to induce a pressure change of said fluid in said working fluid chamber, said partition member being formed with an orifice passage for fluid communication between said pressure-receiving chamber and said working fluid chamber.

* * * * *